United States Patent [19]

Syvertson

[11] Patent Number: 4,975,551
[45] Date of Patent: Dec. 4, 1990

[54] ARC-EXTINGUISHING COMPOSITION AND ARTICLES MANUFACTURED THEREFROM

[75] Inventor: Suzanne M. Syvertson, Northbrook, Ill.

[73] Assignee: S & C Electric Company, Chicago, Ill.

[21] Appl. No.: 456,114

[22] Filed: Dec. 22, 1989

[51] Int. Cl.$^5$ .............................................. H01H 33/04
[52] U.S. Cl. ............................ 200/144 C; 200/149 A; 428/332; 524/425; 525/278
[58] Field of Search ........................ 200/144 C, 149 A

[56] References Cited

U.S. PATENT DOCUMENTS 4,340,790  7/1982  Boliver ............................ 200/144 C Primary Examiner—Robert S. Macon
Attorney, Agent, or Firm—Marshall, O'Toole, Gerstein, Murray & Bicknell

[57] ABSTRACT

An arc-quenching composition that is suitable for deionizing and extinguishing a high-voltage electrical arc comprises an arc-extinguishing material, such as melamine, and a binder, the binder including a thermoplastic polymer polymerized from a carboxylic acid moiety-containing monomer either as a homopolymer or as a copolymer with another monomer, preferably ethylene acrylic acid. The composition comprises effective amounts by weight of the arc-extinguishing material and the thermoplastic polymer to achieve the desired combination of arc-extinguishing properties and structural characteristics, such as tensile strength, elongation, and environmental resistance to thermal cycling. Additionally, the composition for various application and uses may include additives, fillers or fibrous materials. The composition is achieved by compounding of the powdered constituents using dry blending, roll mill, extrusion and/or other plastic compounding techniques to obtain a molding resin. The molding resin is then molded into articles of the desired shape using well-known plastic processing techniques, such as injection molding, extrusion, and the like. In a preferred composition to form a trailer for an interrupter, an ethylene acrylic acid copolymer is combined with melamine to achieve the desired acr-extinguishing and structural characteristics by virtue of the bonding, reaction and/or miscibility between the melamine and the ethylene acrylic acid.

28 Claims, 1 Drawing Sheet

THERMAL CYCLING SCHEDULE

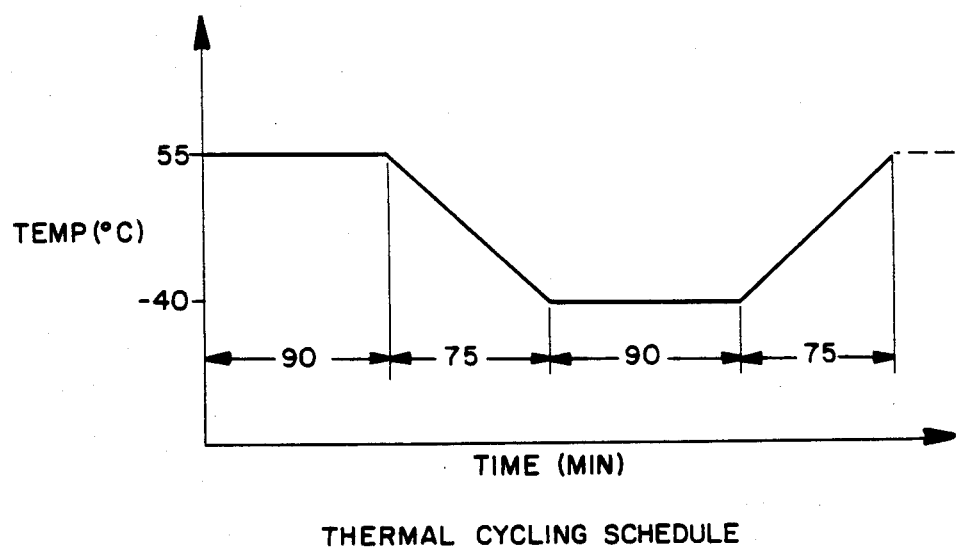
THERMAL CYCLING SCHEDULE

ARC-EXTINGUISHING COMPOSITION AND ARTICLES MANUFACTURED THEREFROM

BACKGROUND OF THE INVENTION

1. Field of the Invention

The present invention relates to arc-quenching materials and articles fabricated therefrom for high-voltage electrical devices and equipment such as circuit interrupters wherein, under certain conditions of operation, a high-voltage electrical arc is produced that is either desirably, or by necessity, quenched. More particularly, the present invention relates to a composition to achieve arc-quenching and structural properties in devices such as circuit interrupters, high-voltage fuses, circuit breakers, and separable cable connectors.

2. Background of the Invention and Prior Art

To provide effective circuit interruption in circuit interrupters, fuses, and the like, it is desirable to utilize an arc-quenching material or compositiion to quench and suppress arcing during contact separation or fuse operation. Of necessity, the arc-quenching materials should include characteristics and properties sufficient for the particular application so as to be effective in quenching arcs via the rapid evolution of quenching gases. Of course, the evolved quenching gases should also be relatively nonconductive. In addition, it is also important that the arc-quenching materials are capable of being molded or otherwise fabricated into suitable articles and shapes having desirable structural properties, thermal stability, and environmental resistance to thermal cycling.

In many circuit-interrupting devices, it is typical to utilize a trailer/liner configuration, as well known in the art, so that the arc is drawn into an annular space defined between the trailer and the liner, each of which is preferably fabricated from an arc-quenching composition. The action of the gases produced by the trailer and/or liner on the confined arc tends to deionize the arc and force its extinction. Examples of trailer/liner configurations are shown in the following U.S. Pat. Nos.: 2,351,826; 2,816,980; 2,816,978; 2,816,985; 4,103,129; and 3,909,570 and in Descriptive Bulletin 811-30 of S&C Electric Company, Chicago, Ill. Similarly, in high-voltage fuses, which also can be characterized as circuit interrupters, a sleeve or liner surrounds the path of the arc during fuse operation with the sleeve or liner being fabricated from an arc-extinguishing material. Reference may be made to U.S. Pat. No. 3,629,767 for an example of a fuse of this type.

Typical arc-extinguishing materials and their properties are disclosed in the following U.S. Pat. Nos.: 3,582,586; 3,761,669; 4,251,699; and 4,444,671. One composition in U.S. Pat. No. 3,582,586 includes melamine and polyethylene. While this composition is generally suitable for various applications and exhibits desirable arc-quenching properties, for many applications, it would be desirable to achieve a composition with improved structural characteristics and environmental resistance to thermal cycling while maintaining the desirable arc-quenching characteristics.

One of the most effective arc-interrupting compounds used in this art is melamine ($C_3N_6H_6$) which is a white crystalline powder having a melting point of about 350° and sublimes at its melting temperatures and below. Other, related nitrogen-containing compounds are also recognized in the prior art as arc-interrupting compounds and are disclosed in Amundson et al U.S. Pat. No. 2,526,448. Melamine and its related compounds have excellent arc-interrupting characteristics but suffer from extreme structural weakness, so that they cannot be molded or pressed into satisfactory structural shapes except in combination with a suitable binder.

For a binder to be most effective in an arc-interrupting composition it should volatilize or decompose in the presence of an electric arc, as does melamine. The binder, however, does not necessarily have to provide any arc-interrupting or arc-extinguishing characteristics to the composition, since, in some cases, the arc-interrupting characteristics of the melamine included in the composition is sufficient for arc-interrupting purposes. The binder, therefore, is primarily included for purposes of providing the melamine-containing composition with sufficient moldability and to provide a molded structure of sufficient physical strength, physical and chemical stability, and electrical insulating properties to provide a structurally sound, molded product. The physical strength of the molded product is most evident in its tensile strength, its percent elongation, and the amount of energy required to break the molded structure.

Structural damage, i.e., cracks have been found in prior art devices containing polyethylene as its primary binder material, and such damage is unacceptable in this art, since the break point allows another air space for the gases and arc to fill, thereby significantly lessening the arc-interrupting properties of the arc-interrupting device. Thermoplastic polymeric binders have been found to be the most useful in arc-interrupting compositions based upon melamine or similar compounds, since the thermoplastic binders volatilize or decompose in the presence of an electric arc at lower power conditions than necessary to sublime melamine thereby producing large volumes of gas to drive the melamine into the core of the arc and to extinguish the arc under a wide range of power conditions. Further, the thermoplastic binders provide compositions with good molding characteristics, stability and electrical insulating properties.

Typical thermoplastic polymeric resins known to be useful as binders in melamine-based arc-interrupting compositions include polyethylene, polypropylene, polytetrafluoroethylene, acrylics, polystyrene, cellulosics and polyimides. Other binders, such as thermosetting resins, epoxy resins, polyester resins, phenolic resins, and the like, also are known to be useful as binders in arc-interrupting compositions. It is also known to include elastomeric, rubber-like materials as a portion of the binder in melamine-based arc-interrupting compositions such as butyl compounds, isoprene-based compounds, neoprene-based compounds and other synthetic elastomers.

SUMMARY OF THE INVENTION

In brief, the present invention is directed to a new and improved arc extinguishing composition including a new and improved binder for compositions containing an arc-interrupting compound, such as melamine, and to a method of extinguishing an arc by disposing the composition along the path of the arc, particularly in contact with the arc when the binder, or at least a portion of the binder, is a carboxylic acid group containing polymer, particularly a copolymer of two different monomers, at least one of which contains a caboxylic acid moiety, such as an ethylene acrylic acid copolymer. It is believed that the binder of the present invention, including a plurality of extending carboxylic acid moieties, interacts with arc-extinguishing compounds having carboxylic acid-active sites, such as amine, thiol, alcohol, halogen, and the like sites, to provide new and unexpected physical strength and stability to the composition. The molded composition including the arc-interrupting compound and the binder, maintains excellent arc-interrupting capability, chemical stability and electrical insulating properties as well as unexpected physical strength.

The arc-quenching composition of the present invention is suitable for deionizing and extinguishing a high-voltage electrical arc. The composition includes effective amounts of the arc-extinguishing material, such as melamine, and the binding polymer to achieve the desired combination of arc-extinguishing properties and structural characteristics such as tensile strength, elongation, environmental resistance to thermal cycling, and the like. Additionally, the composition for various applications and uses may include additives, fillers or fibrous materials.

The composition is homogenized by compounding the constituents using dry blending, roll mill, extrusion and/or other plastic compounding techniques to obtain the molding resins. The molding resin then is molded into articles of the desired shape using plastic processing techniques, such as injection molding, extrusion, and the like. In a preferred composition to form a trailer for an interrupter, an ethlene acrylic acid copolymer is combined with melamine to achieve the desired arc-extinguishing and structural characteristics by virtue of the bonding and/or miscibility between the melamine and the ethylene acrylic acid copolymer.

Accordingly, it is an object of the present invention to provide a new and improved arc-quenching composition comprising effective proportions of an arc-extinguishing material, such as melamine, and a thermoplastic polymeric binder containing carboxylic acid moieties, such as ethylene acrylic acid, to achieve improved strength and desirable environmental resistance to thermal cycling.

It is another object of the present invention to provide a new and improved arc-extinguishing composition with improved structural characteristics while exhibiting the same desirable electrical characteristics of previously available arc-extinguishing materials.

Another object of the present invention is to provide a new and improved arc-extinguishing composition including an arc-interrupting compound and a polymeric binder wherein the binder is a copolymer formed from two different monomers at least one of which includes extending carboxylic acid groups or moieties in the free acid, neutralized, or partially neutralized form.

Another object of the present invention is to provide a new and improved arc-extinguishing composition including an arc-extinguishing compound having at least one site reactive with a carboxylic acid group; or a polymeric binder material including a plurality of reactive carboxylic acid moieties, such that when the composition is molded under heat and pressure, the arc-extinguishing compound and the polymeric binder will chemically bond (including ionic and/or covalent bonds) to provide new and unexpected physical strength in the molded composition.

Still another object of the present invention is to provide a new and improved arc-interrupting composition including an arc-interrupting compound having at least one reactive amine site in its molecule, such as melamine, and a thermoplastic resin binder material polymerized as a copolymer of two monomers forming a linear polymeric backbone having extending carboxylic acid moieties, such as ethylene acrylic acid, propylene acrylic acid, or derivatives thereof.

Another object of the present invention is to provide a new and improved arc-interrupting composition that provides sufficient and excellent arc-interrupting characteristics as well as new and unexpected molding and physical strength properties such as tensile strength, elongation and ability to withstand thermal cycling and resist cracking.

The above and other objects and advantages of the present invention will become apparent from the following detailed description of the preferred embodiments.

BRIEF DESCRIPTION OF THE DRAWING

The drawing is a graph showing the thermal cycling schedule used to test the thermal cycling characteristics of the arc-extinguishing compositions.

DETAILED DESCRIPTION OF THE PREFERRED EMBODIMENTS

It has been found that the physical and thermal properties of an arc-extinguishing compound can be unexpectedly improved when the arc-extinguishing compound includes a thermoplastic binder polymerized from a carboxylic acid moiety-containing monomer, particularly copolymers such as a copolymer of an olefin, such as ethylene or propylene, and a carboxylic acid-containing monomer, such as acrylic acid. These binders are particularly effective when used with arc-extinguishing compounds that have available carboxylic acid-reactive sites, such as amine groups, compounds containing on or more available hydroxyl groups, epoxy groups, aziridine groups, or thiol groups having available carboxylic acid-reactive sulphur atoms, but are also effective with other arc-extinguishing compounds. The binders of the present invention have been found to be particularly effective with melamine or other similar arc-extinguishing compounds, such as those disclosed in Amundson et al U.S. Pat. No. 2,526,448, hereby incorporated by reference.

The polymeric binder of the present invention need not form 100% of the binder material used in the arc-extinguishing composition and excellent results have been found in improvement of known arc-extinguishing compositions when the binder of the present invention is included in only a small portion of the binder material used.

The binders used in the arc-interrupting compositions of the present invention can be used in a widely varying amount, as well known in the art, together with the arc-interrupting compound, such as melamine, and can be a combination of a number of different thermosetting and/or thermoplastic binder materials well known in the art. The binders are usually included in amounts of at least 10% by weight of the total arc-interrupting composition and preferably in an amount of at least 20% by weight of the arc-interrupting composition. The best results for purposes of molding, physical and chemical stability and strength, arc-interrupting characteristics and insulation properties are achieved when the total amount of binders are in the range of about 15% to about 50% by weight of the arc-interrupting composition, preferably in the range of about 20% to about 40%, based on the total weight of the finished molded arc-interrupting composition.

The arc-interrupting compound included in the compositions of the present invention, such as melamine, are included in the compositions in their normal amounts, well-known in the art, and generally in amounts of about 25% to about 90% by total weight of the arc-interrupting composition. Excellent results are achieved with arc-interrupting compounds and binder materials present in proportions ranging from about four parts of arc-interrupting compound to one part of binder material by weight to about one part of arc-interrupting compound to one part of binder material. Best results are achieved when the arc-interrupting compound is included in the composition in an amount of two to three parts of arc-interrupting compound per part of binder material by weight.

Of the total polymeric binders included in the arc-interrupting composition of the present invention, the carboxylic acid group-containing polymers or copolymers of the present invention should be included in an amount sufficient to improve the tensile strength of the molded composition, preferably more than a 10% increase in tensile strength, as a result of the addition of the carboxylic acid group-containing binder of the present invention.

For example, a typical prior art arc-interrupting composition includes melamine in a polyethylene binder in proportions of three parts of melamine to one part of polyethylene binder and has a tensile strength of 1133 psi. By replacing only 5% of the polyethylene with an ethylene acrylic acid copolymer of the present invention, the tensile strength is increased to 1582 psi. By totally eliminating the polyethylene and substituting 100% ethylene acrylic acid as the binder material for melamine, the tensile strength is increased to 1677 psi. Physical strength improvements are achieved with the inclusion of the carboxylic acid group-containing binder materials of the present invention in amounts as low as about 0.5% based on the total weight of binders present in the composition up to 100% replacement of the binder material with the carboxylic acid group-containing binders.

To achieve the full advantage of the present invention, the binder material used with the arc-interrupting compound should include the carboxylic acid group-containing polymers or copolymers of the present invention in amounts of about 2% by weight to about 100% by weight based on the total weight of binders contained in the composition. The remaining percentage of binder material can be any binder effective for moldability and arc-extinguishing characteristics such as the polyolefins, e.g. polyethylene and/or polypropylene; polyfluorinated resins, such as polytetrafluoroethylene, acrylic resins, and any other suitable binders, including thermosetting resins, such as epoxy resins, polyester resins, phenolic resins, and the like. Various elastomeric materials also may be included to improve the elongation properties of the molded compositions, such as butyl-based and isoprene and/or neoprene-based synthetic elastomers.

The binders of the present invention are useful with any arc-interrupting compounds to provide an arc-quenching composition that is readily moldable into a desired shape while exhibiting structural properties, thermal stability, and environmental resistance to thermal cycling heretofore impossible with known arc-quenching compositions. Very unexpected structural improvements are achieved when the arc-interrupting compound is a material that includes one or more reactive sites that are reactive with the carboxylic acid moieties of the binders of the present invention. For example, melamine ($C_6N_6H_6$) includes three equally spaced reactive amine moieties that can chemically bond (including ionic and/or covalent bonds) with the extending carboxylic acid moieties of the binders of the present invention achieving new and unexpected tensile strength, elongation and resistance to thermal cycling.

In the preferred embodiment, the percentage of carboxylic acid group-containing monomer used in forming the copolymer, such as in the copolymerization of acrylic acid and an olefin, such as ethylene, propylene and the like, can be varied widely to provide sufficient carboxylic acid moieties in the copolymer for chemical bonding (including ionic and/or covalent bonds) at one, two or all three of the reactive amine sites extending from the melamine molecule. In this manner, different degrees of compound-binder chemical bonding can be provided for different properties when the carboxylic acid group-containing polymers of the present invention are used as at least a portion of the binder in the manufacture of arc-quenching compositions.

Generally, the amount of carboxylic acid group-containing monomer copolymerized with a second monomer in forming the copolymers of one embodiment of the present invention is from about 0.5 percent to about 80%, based on the total weight of the monomers, with the second monomer present in an amount of about 20% by weight to about 95% by weight based on the total weight of both monomers. The copolymers are readily available, such as the ethylene acrylic acid copolymers manufactured by Allied Corporation of Morristown, N.J. and from the Dow Chemical Company under the Trademarks PRIMACOR, 3150, 3330, 3340, 3440, 3460 and 2912 containing various amounts of acrylic acid monomer. The ethylene acrylic acid copolymer sold by Dow Chemical under the Trademark PRIMACOR 3460, having a melt index of 20° C. per minute determined by ASTMD1238 and disclosed in U.S. Pat. No. 4,599,392, hereby incorporated by reference, containing about 9.5% (ASTM4094) by weight acrylic acid in the copolymer, provides an arc-quenching composition having exceptionally good structural characteristics, thermal stability and environmental resistance to thermal cycling. Other grades of ethylene acrylic acid copolymer can be used having more or less of an acrylic acid percentage where the carboxylic acid group is available as the free acid or in the neutralized or partially neutralized form, and should provide similar structural improvements when used as a binder in arc-quenching compositions in accordance with the present invention.

While not being bound to any particular theory of why the carboxylic acid group-containing polymers of the present invention provide new and unexpected structural properties, thermal stability and resistance to thermal cycling, it is theorized that a reactive site on the arc-quenching compound chemically bonds (ionically and/or covalently) with the carboxylic acid moiety of the polymeric binders of the present invention to achieve new and unexpected tensile strengths, elongation and resistance to cracking heretofore unachieved in the prior art. In addition to the reactive amine groups extending from melamine arc-quenching compounds, other arc-quenching compounds also include reactive sites such as benzoguanamine having a pair of extending reactive amine groups; thio substituted organic arc-quenching compounds such as dithioammelide; ammeline; and halogenated compounds such as cyanuric chloride. Each of these compounds has the ability to generate large volumes of arc-extinguishing gases under the influence of an electric arc and are disclosed in more detail in the Amundson et al U.S. Pat. 2,526,448. Each of these compounds is useful in accordance with the present invention in combination with the binders of the present invention to achieve new and unexpected structural, mechanical and physical properties in an arc-extinguishing or arc-interrupting composition.

It is theorized that a reactive, arc-extinguishing compound, such as melamine, undergoes chemical bonds (ionic and/or covalent bonding) with the copolymers of the present invention by reacting with the carboxylic acid group at one or more of the reactive compound sites, as follows:

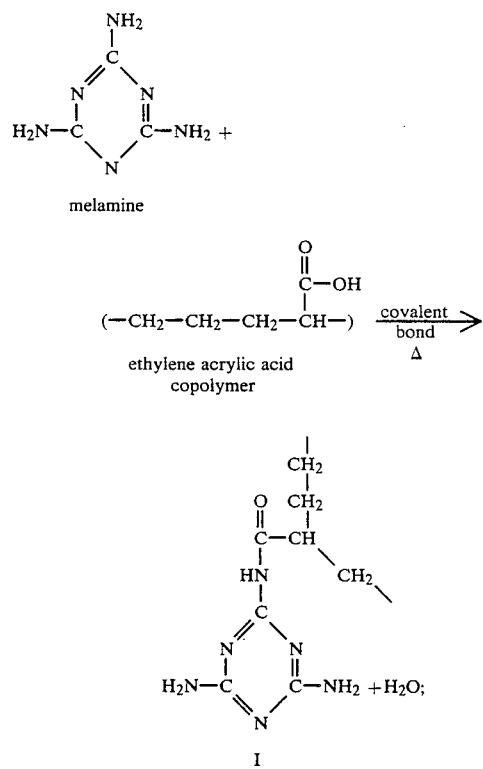

The molar amount of carboxylic acid groups in the polymer in relation to the molar amount of amine groups on the melamine will dictate the amount of compounds I, II or III that form when the compositions of the present invention are heated to mold the compositions into a predetermined shape. With smaller amounts of carboxylic acid groups in the ethylene acrylic acid copolymer, e.g. 10% by weight or less, compound I is mostly produced in the arc-extinguishing composition, with a very small quantity of compounds II and III. Higher amounts of carboxylic acid groups in the copolymer will provide more of compounds II and III.

Similarly, the arc-extinguishing melamine compound can bond ionically to the carboxylic acid groups of the ethylene acrylic acid copolymer, as follows:

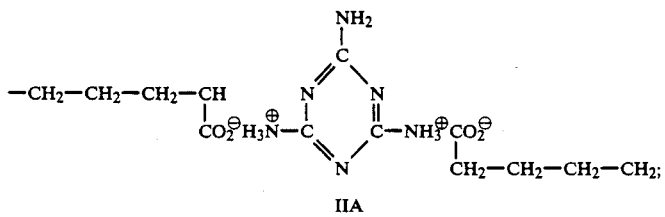

IIA and/or

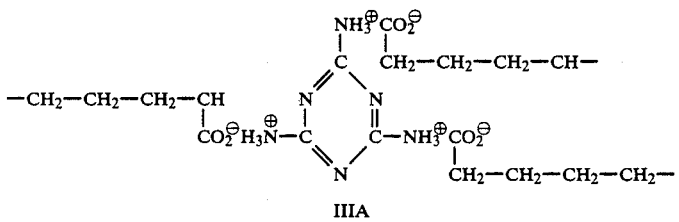

IIIA

The amounts of compounds IA, IIA and IIIA formed when the melamine and ethylene acrylic acid copolymer are molded under heat and pressure again will depend upon the amount of carboxylic acid groups available from the polymer for bonding to the amine groups of the melamine.

Similarly, any arc-extinguishing compounds that have reactive epoxy groups, aziridine groups, thiol groups, hydroxyl groups, halogen groups, and the like carboxylic acid group-reactive sites, also can chemically bond (including ionic and/or covalent bonds) with the extending carboxylic acid groups from the polymeric binders used in the compositions of the present invention to provide new and unexpected structural properties, thermal stability, and thermal cycling resistance.

The molecular weights of these copolymers vary widely and can range from a low of about 250 weight average molecular weight to a high of about 500,000 or more while achieving exceptionally good physical properties, thermal stability and resistance to thermal cycling in accordance with the present invention. It is preferred that the weight average molecular weight of the polymeric binders of the present invention be in the range of about 1,000 to about 100,000 weight average molecular weight, and preferably in the range of about 1,000 to about 50,000 weight average molecular weight.

Other materials may be added to the compositions of the present invention for additional insulating, strength, and/or arc-extinguishing properties, generally in amounts of about 0.1% to about 10% by total weight of the composition. Fibrous additives include glass, inorganic fibers and organic fibers, such as polyacrylonitrile, polyamide and polyester fibers. Fillers that may be included are, for example, cellulosic materials, calcium carbonate, metal oxides, comminuted polymers, carbon black, natural and synthetic silica materials.

DATA

In order to show the unexpected structural properties that are achieved with the compositions of the present invention as compared to other arc-extinguishing compositions, prepared using other binders, various compositions were prepared in a common weight ratio of 3 parts by weight melamine to 1 part by weight binder.

The binders were varied and compared against the standard prior art low density polythylene material. In every composition where polyethylene was used as a binder, it was this same polyethylene (PE) for comparison, unless otherwise indicated.

Twelve different formulations were compounded for the collection of data, categorized in essentially four distinct groups.

The first group are formulations where additives were incorporated in the standard melamine-polyethylene composition in an attempt to improve the mechanical properties by establishing bonds between the melamine and the PE matrix.

a. coupling agent—Formulations #2 and 3
 b. lubricant—Formulation #4
 c. EAA—Formulation #5

The second group are formulations where a different resin matrix based on PE is used which possesses better strength and elongation properties than the standard PE matrix.

a. EAA—Formulation #6
 b. EVA—Formulation #7
 c. Lower density, lower melt index, more flexible PE Formulation #8

The third category, formulation #9, uses a finer particle size melamine to allow better dispersion of the melamine in the PE matrix, in an attempt to improve the compound's mechanical properties.

The fourth group of formulations have variations in the percentage by weight of PE. These compounds were examined to determine whether the composition properties would vary significantly with minor changes in the amount of PE.

Formulations #10, 11, and 12

The compounding of the formulations into a moldable resin was done using the same processing techniques and conditions as for the standard melamine —PE compositions.

All formulations were easily molded into test samples (tensile trailers and liners) using the standard molding conditions.

The average tensile properties of 25 samples of each formulation is shown in Table I.

TABLE I

| Formulation # | Description | Tensile Properties Load (pounds) | Tensile Strength (psi) | Elongation (%) | Modulus (psi) | Energy to Break (inch-lbs) |
|---|---|---|---|---|---|---|
| 6 | EAA Substitute for 100% PE | 104 | 1677 | 3.89 | 238950 | 3.23 |
| 5 | EAA Substitute for 5% PE | 98 | 1582 | 1.41 | 252980 | 0.97 |
| 7 | EVA Matrix | 47 | 763 | 1.04 | 253200 | 0.38 |
| 9 | Finer Melamine | 90 | 1445 | 0.83 | 355320 | 0.51 |
| 8 | PE Matrix | 51 | 824 | 0.81 | 197300 | 0.31 |
| 11 | Change % PE (+2%) | 72 | 1157 | 0.67 | 390000 | 0.34 |
| 10 | Change % PE (−2%) | 68 | 1096 | 0.64 | 347800 | 0.29 |
| 12 | Change % PE (+4%) | 67 | 1075 | 0.60 | 290025 | 0.27 |
| 1 | Standard Melamine-PE | 70 | 1133 | 0.57 | 422980 | 0.26 |
| 2 | 0.2% by wt. titanate coupling agent A | 57 | 925 | 0.46 | 243933 | 0.18 |
| 4 | 0.3% by weight Epoxide Alpha Olefin lubricant | 51 | 828 | 0.41 | 342667 | 0.14 |
| 3 | 0.2% by wt. titanate coupling Agent B | 48 | 774 | 0.41 | 339040 | 0.14 |

Formulation #6 (EAA substitute for 100% PE) had the highest tensile properties of all the formulations. Compared to the standard composition (formulation #1), formulation #6 had a 48% higher tensile strength and approximately a 6 times greater elongation.

A molded tensile sample of each formulation was examined using scanning electron microscopy. The resulting observations provide some insight into structural reasons for the tensile properties of the various formulations. Formulations #10, 11, 12 being merely a variation in the percentage PE had similar structures to the standard composition, #1. Formulations #2, 3, 7 and 8 also showed similar structures to Formulation #1. The addition of a titanate coupling agent (#2, 3) and use of an ethylene vinyl acetate (EVA) binder (#7) or a more flexible PE (#8) matrix material did not establish any bond between the melamine and the tensile properties of the matrix material. The Formulations #2, 3, 7, 8, 10, 11 and 12 were approximately the same or lower than the standard melamine −PE composition #1.

Formulation #4 incorporated a lubricant which from SEM observations appears to create some wetting of the melamine particles. However, the tensile properties of this formulation was significantly lower than the standard composition (#1).

Formulations #5, 6, and 9 all exhibit structural differences from #1. Formulation #5 had some bonding sites between the melamine and the PE. Formulation #6 showed either bonding of the melamine particles and/or possible miscibility between EAA and melamine. Formulation #9 had a good dispersion of finer melamine particles in the PE matrix. These three formulations had significantly higher tensile properties than the standard melamine −PE composition (#1).

Trailers as shown on page 15 of S & C Electric Company descriptive bulletin 811-30, were molded from the three formulations #5, 6 and 9. These trailers are approximately four inches long, three-quarters of an inch in diameter and include a centrally disposed rod extending longitudionally therethrough. The standard melamine −PE composition, #1, was also molded as a control.

Liners for use with the trailers were molded of formulations #1, #5 and #6. Formulation #9 was omitted because of poor initial results from the thermal cycling of the trailers.

Ten trailers made of each of the formulations #1, 5, 6 and #9, were subjected to 200 thermal cycles as shown in FIG. 1. After 200 cycles, formulation #6 was the only formuation showed no evidence of radial cracks.

Preliminary electrical tests have been performed on formulation #6 using the molded trailer and liner. Initial results at 38 kV indicate that formulation #6 performed better than the standard melamine −PE (3:1) composition for arc erosion with less carbonization.

In addition to the other properties already mentioned, the density, glass transition temperature, melt temperature, coefficient of thermal expansion and yield strength of formulation #6 were determined and listed in Table II.

TABLE II

Properties of Melamine-EAA (Formulation #6) Compared to Standard Melamine-PE Composition (Formulation #1)

| | #6 | | #1 | |
|---|---|---|---|---|
| Density, g/cm$^3$ | 1.334 | | 1.319 | |
| Glass Transition Temperature, °C. | 18.3–48.3 | | 40.3 ± 4.9 | |
| Melt Temperature, °C. | 80 | | 101 | |
| Coefficient of Thermal Expansion, m/m °C. | (from) (−40 to 20° C.) | 87.9 ± 13.0 | (from) (15 to 35° C.) | 84.9 ± 10.8 |
| | (from) (50 to 80° C.) | 224.2 ± 93.7 | (from) (55 to 90° C.) | 121.5 ± 13.3 |
| Yield Strength (0.2%), psi | 914 | | 1058 | |

While there have been illustrated and described various embodiments of the present invention, it will be apparent that various changes and modifications will occur to those skilled in the art. It is intended in the appended claims to cover all such changes and modifications as fall within the true spirit and scope of the present invention. Additionally, it should be understood that the foregoing description is to be construed as illustrative and not in any limiting sense.

What is claimed and desired to be secured by Letters Patent of the United States is:

I claim:

1. An arc-quenching composition comprising an effective amount of an arc-extinguishing compound; and a binder for the arc-extinguishing compound, said binder being a thermoplastic polymer, wherein one of the monomers of the polymer includes a carboxylic acid moiety.

2. The composition of claim 1 wherein the arc-extinguishing compound includes at least one moiety reactive with the carboxylic acid moiety of the binder.

3. The composition of claim 2, wherein the reactive moiety of the arc-extinguishing compound is selected from the group consisting of amine, alcohol, hydroxyl, halogen, thiol, epoxy and aziridine moieties and mixtures thereof.

4. The composition of claim 1, wherein the arc-extinguishing compound is selected from the group consisting of melamine, benzoguanamine, dithioammelide, ammeline, and a cyanuric halide, and mixtures thereof.

5. The composition of claim 1, wherein the binder is a copolymer of a polyolefin and a carboxylic acid group-containing monomer.

6. The composition of claim 5, wherein the carboxylic acid group-containing monomer has 2 to 7 carbon atoms.

7. The composition of claim 5, wherein the polyolefin is selected from the group consisting of polyethylene and polypropylene and the carboxylic acid group-containing monomer is selected from the group consisting of acrylic acid and methacrylic acid.

8. A composition useful to quench an electrical arc comprising an effective amount of melamine bonded at one or more of its amine groups to one or more carboxylic acid groups of a thermoplastic polymeric binder.

9. The composition of claim 8, wherein the bond is the ionic bond $NH_3^+CO_2^-$ formed between the amine group of the melamine and the carboxylic acid group of the polymeric binder to bond the binder to the melamine.

10. The composition of claim 8, wherein the bond is a covalent bond between a nitrogen atom of a melamine amine moiety and the carboxylic acid carbon atom of the polymeric binder.

11. The composition of claim 8, wherein the carboxylic acid group-containing polymeric binder has a weight average molecular weight below about 100,000.

12. The composition of claim 11, wherein the carboxylic acid group-containing binder has a weight average molecular weight below about 50,000.

13. The composition of claim 12, wherein the carboxylic acid-group containing binder has a weight average molecular weight of about 1,000 to about 20,000.

14. The composition of claim 8, wherein the melamine is included in the composition in a weight ratio, compared to the binder, of about 4:1 to about 1:1.

15. The composition of claim 8, further including a second thermoplastic binder, together with the carboxylic acid group-containing binder.

16. The composition of claim 15, wherein the carboxylic acid group-containing binder is an ethylene acrylic acid copolymer and the second binder is polyethylene.

17. The composition of claim 8, wherein the binder is a copolymer wherein one of the monomers of the copolymer includes one or more carboxylic acid groups.

18. The composition of claim 17, wherein the carboxylic acid group-containing monomer is present in the copolymer in an amount of about 1% by weight to about 95% by weight of the copolymer.

19. The composition of claim 18, wherein the carboxylic acid group-containing monomer is present in the copolymer in an amount of about 2% by weight to about 50% by weight of the copolymer.

20. The composition of claim 19, wherein the carboxylic acid group-containing monomer is present in the copolymer in an amount of about 3% by weight to about 15% by weight of the copolymer.

21. The composition of claim 20, wherein the carboxylic acid group containing monomer is present in the copolymer in an amount of about 6% by weight to about 10% by weight of the copolymer.

22. A method of extinguishing an electrical arc comprising disposing the composition of claim 1 along the path of an electrical arc thereby causing an arc-extinguishing gas to evolve from said composition to extinguish said arc.

23. The method of claim 22, wherein the composition is molded under heat and pressure to melt the composition into a predetermined shape of homogeneous composition prior to disposing the shaped composition along the path of the arc.

24. The method of claim 23, wherein the molding process causes a reaction between the arc-interrupting compound and the binder to increase the tensile strength of the composition.

25. The method of claim 24, wherein the arc-interrupting compound is melamine and the binder is an ethylene acrylic acid copolymer and wherein the reaction is selected from the group consisting of an ionic bond between one or more amines of the melamine and one or more carboxylic acid groups of the copolymer to form a-$NH_3^+CO_2^-$ bond; and a covalent bond between one or more amine groups of the melamine and one or more carboxylic acid groups of the copolymer to form a —NH—CO—C— covalent bond between the melamine and the copolymer.

26. An electrical circuit interrupting device comprising an insulating body defining a surface adapted to be disposed along a path of an electric arc, said surface having the composition as defined in claim 1.

27. A method of quenching an electrical arc comprising disposing the composition of claim 8 in close proximity to the arc such that the heat transferred from the arc to the composition causes a sufficient quantity of deionizing and extinguishing gas to be emitted from the composition to quench the arc.

28. An electrical circuit comprising means for forming an electrical arc, and an arc-interrupting composition disposed along the path of the arc, said composition including an arc-extinguishing compound and a copolymeric thermoplastic binder for said compound, said copolymer including a plurality of carboxylic acid groups.

* * * * *

UNITED STATES PATENT AND TRADEMARK OFFICE
CERTIFICATE OF CORRECTION

PATENT NO. : 4,975,551

DATED : Dec. 4, 1990

INVENTOR(S) : Suzanne M. Syvertson

It is certified that error appears in the above-identified patent and that said Letters Patent is hereby corrected as shown below:

Col. 4, line 37, "on" should be -- one --;

Col. 5, line 6, "well-known" should be -- well known -- (no hyphen);

Col. 6, line 28, "0.5 percent" should be -- 0.5% --;

Col. 11, line 36, before "Formulations" insert -- tensile properties of the --;

Col. 11, line 66, "descriptive bulletin" should be -- Descriptive Bulletin --

Col. 11, line 36, after "the" delete --tensile properties of the--.

Signed and Sealed this

Nineteenth Day of May, 1992

Attest:

DOUGLAS B. COMER

Attesting Officer

Acting Commissioner of Patents and Trademarks